United States Patent [19]

Tamura et al.

[11] 4,291,142

[45] Sep. 22, 1981

[54] CROSSLINKED AROMATIC POLYAMIDE FILM AND PROCESS FOR PRODUCING THE SAME

[75] Inventors: Yorikazu Tamura; Akihiro Aoki; Keizo Shimada, all of Iwakuni, Japan

[73] Assignee: Teijin, Limited, Osada, Japan

[21] Appl. No.: 55,475

[22] Filed: Jul. 6, 1979

[30] Foreign Application Priority Data

Jul. 18, 1978 [JP] Japan .................................. 53-86785

[51] Int. Cl.$^3$ ............................................ C08G 69/48
[52] U.S. Cl. .............................. 525/420; 204/159.14; 204/159.15; 204/159.19; 525/419; 525/426; 525/427; 525/428; 528/348
[58] Field of Search ............... 525/426, 427, 428, 420, 525/419; 204/159.14, 159.15, 159.19

[56] References Cited

U.S. PATENT DOCUMENTS

| | | | |
|---|---|---|---|
| 3,287,324 | 11/1966 | Sweeny | 528/348 |
| 3,767,756 | 10/1973 | Blades | 264/184 |
| 4,070,433 | 1/1978 | Miyoshi et al. | 264/233 |
| 4,086,215 | 4/1978 | Kurihara et al. | 528/420 |

OTHER PUBLICATIONS

English Translation–Japanese Laid–Open Specification No. 122160/76 filed Apr. 17, 1975.
English Translation–Japanese Laid–Open Specification No. 122173/76 filed Apr. 17, 1975.
English Translation–Japanese Laid–Open Specification No. 152973/77 filed Jun. 15, 1976.
English Translation–Japanese Laid–Open Specification No. 45238/78 filed Jan. 14, 1975.

*Primary Examiner*—Harold D. Anderson
*Attorney, Agent, or Firm*—Burgess, Ryan and Wayne

[57] ABSTRACT

Aromatic polyamide film, having an excellent thermal resistance and a high dielectric breakdown strength, which comprises an aromatic polyamide containing repeating units of the formula

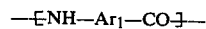
—[NH—Ar$_1$—CO]— or

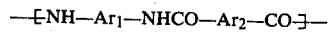

—[NH—Ar$_1$—NHCO—Ar$_2$—CO]— and cross-linked with a cross-linking compound having at least one radical selected from

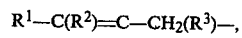
$R^1$—C(R$^2$)=C—CH$_2$(R$^3$)—,

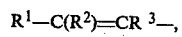
$R^1$—C(R$^2$)=CR$^3$—,

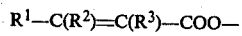
$R^1$—C(R$^2$)=C(R$^3$)—COO— and

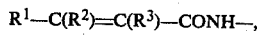
$R^1$—C(R$^2$)=C(R$^3$)—CONH—, or another cross-linking cyanuric or isocyanuric acid compound, by means of heat, ultraviolet rays or electron beam.

11 Claims, No Drawings

CROSSLINKED AROMATIC POLYAMIDE FILM AND PROCESS FOR PRODUCING THE SAME

The present invention relates to an aromatic polyamide film and a process for producing the same. More particularly, the present invention relates to an aromatic polyamide film having an enhanced heat resisting property and improved electrical properties and a process for producing the same.

It is known that the so-called wholly aromatic polyamide resins have not only excellent thermal properties, for example, a high melting point and an excellent heat resistance, but also, excellent mechanical properties, for instance, a high tenacity and an abrasion resistance. Especially, the chemical industry's attention is now drawn to the fact that p-phenylene terephthalamide type polymers, halogen-substituted p-phenylene terephthalamide type polymers, m-phenylene terephthalamide type polymers, p-phenylene isophthalamide type polymers and m-phenylene isophthalamide type polymers, respectively, exhibit a relatively high processability, and therefore, are useful as a material for producing fibers, filaments, fibrids, threads, films, paper-like sheets and other shaped articles. However, it is, also, known that the dielectric breakdown strength and heat resistance, especially, resistance to thermal decomposition, of the conventional aromatic polyamide resin articles are inferior to those of polyimide resin articles. Particularly, it has been strongly desired to provide a new type of aromatic polyamide film or sheets having an improved heat resistance and enhanced dielectric properties, in order to expand the use of the aromatic polyamide films or sheets.

For the purpose of attaining the above-mentioned properties, Japanese Patent Applications Laying-open Nos. 51-122160 (1976) and 51-122173 (1976) disclosed a method in which an m-phenylene isophthalamide type polymer film was treated with a higher fatty acid, fluorinated or chlorinated aliphatic carboxylic acid or aromatic hydrocarbon having a methyl radical. Also, Japanese Patent Applications Laying-open Nos. 52-56169 (1977) and 52-152973 (1977) disclosed a method for improving the electrical properties of the aromatic polyamide film by drawing it biaxially. Furthermore, Japanese Patent Application Publication No. 53-45238 (1978) disclosed a method in which a halogen-substituted p-phenylene terephthalamide type polymer film was heat-treated under tension to reduce the moisture absorbing property of the film. The reduction of the moisture absorption causes the dielectric properties of the film to be improved.

Each of the above-mentioned prior art methods are effective for modifying only a dielectric property, such as dielectric breakdown strength, of the aromatic polyamide film. However, the modified value of the dielectric breakdown strength of the aromatic polyamide films of the above-mentioned prior art is still inferior to that of the polyimide resin films and the polyester resin films. Also, none of the above-mentioned prior art discloses any method effective for enhancing the heat resisting property, especially, resistance to thermal decomposition.

An object of the present invention is to provide an aromatic polyamide film having not only an improved dielectric breakdown strength but, also, an enhanced resistance to thermal decomposition or deterioration, and a process for producing the same.

Another object of the present invention is to provide an aromatic polyamide film having a reduced solubility in solvent without reducing mechanical properties thereof, and a process for producing the same.

The above mentioned objects can be attained by the aromatic polyamide film and the process for producing the same of the present invention.

The aromatic polyamide film of the present invention comprises:

at least one aromatic polyamide containing repeating units selected from the group consisting of those of the formulae (I) and (II):

and

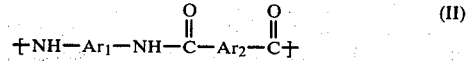

wherein $Ar_1$ and $Ar_2$ respectively represent, independently from each other, an unsubstituted or substituted divalent aromatic radical which comprises a single aromatic ring or two or more aromatic rings that are condensed together or are linked together by a single bond or by a bridging atom or radical and which is oriented either meta or para, the aromatic polyamide molecules being cross-linked with at least one cross-linking compound.

The above-mentioned aromatic polyamide film can be produced by the process of the present invention which comprises the steps of:

shaping a composition into a film, which composition comprises (1) at least one aromatic polyamide containing repeating units selected from the group consisting of those of the formulae (I) and (II):

and

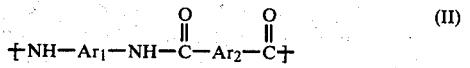

wherein $Ar_1$ and $Ar_2$ respectively represent, independently from each other, an unsubstituted or substituted divalent aromatic radical which comprises a single aromatic ring or two or more aromatic rings that are condensed together or are linked together by a single bond or by a bridging atom or radical and which is oriented either meta or para, and (2) at least one cross-linking compound and (3) a liquid; removing the organic liquid from the composition to provide a solid precursory aromatic polyamide film, and; applying heat, ultra-violet rays or electron beam onto said precursory aromatic polyamide film to cross-link said aromatic polyamide molecules with said cross-linking compound.

In the aromatic polyamide film and the process of the present invention, the cross-linking compound is selected from the class consisting of compounds which have at least one radical selected from the group consisting of those of the formulae (III), (IV), (V) and (VI):

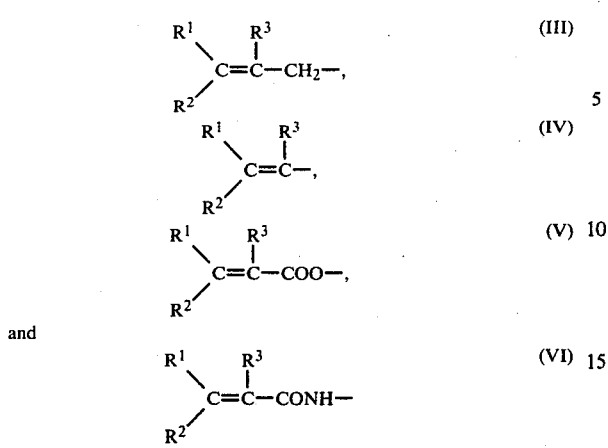

and

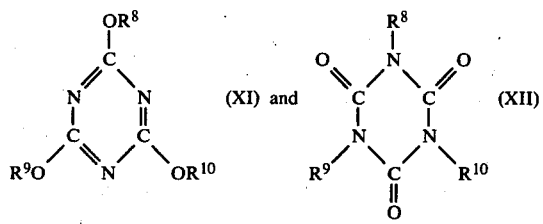

wherein $R^1$, $R^2$ and $R^3$ respectively represent, independently from each other, a member selected from the group consisting of a hydrogen atom and alkyl radicals having 1 to 6 carbon atoms, and other compounds of the formulae (XI) and (XII):

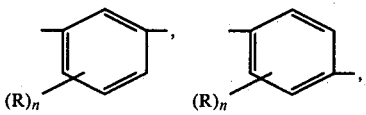

wherein $R^8$, $R^9$ and $R^{10}$ respectively represent, independently from each other, a member selected from the group consisting of a hydrogen, atom, alkyl radicals having 1 to 10 carbon atoms, hydroxyalkyl radicals having 1 to 10 carbon atoms, carboxyalkyl radicals having 1 to 10 carbon atoms and halogenated alkyl radicals having 1 to 10 carbon atoms.

The present invention provides a cross-linked aromatic polyamide film which exhibits an enhanced resistance to solvents, an extremely enhanced heat resistance and a remarkably improved dielectric breakdown strength.

The aromatic polyamide usable as a matrix component of the film of the present invention, comprises the repeating units selected from the group consisting of those of the formulae (I) and (II) specified hereinbefore. The polyamide may be a homopolymer consisting of the repeating units of either one of the formulae (I) and (II) or may be a copolymer consisting of the repeating units of both the formulae (I) and (II). Also, the polyamide may be a copolymer comprising at least 75 molar % of the repeating units selected from those of the formulae (I) and (II).

In the formulae (I) and (II) defined hereinabove, the moieties $Ar_1$ and $Ar_2$ may be respectively selected, independently from each other, from the group consisting of, for example, the radicals of the formulae:

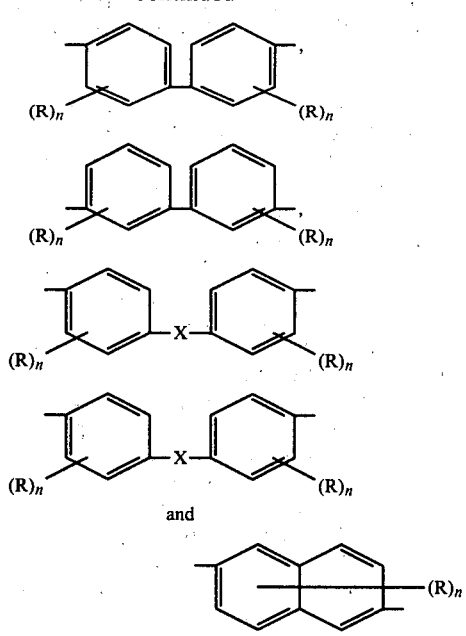

wherein R represents a member selected from the group consisting of lower alkyl radicals having 1 to 6 carbon atoms, lower alkoxy radicals having 1 to 6 carbon atoms, halogen atoms and a nitro radicals, n represents zero or an integer of from 1 to 4 and X respresents a member selected from the group consisting of

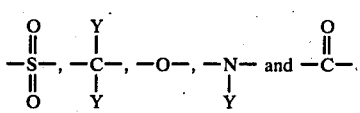

wherein Y represents a member selected from the group consisting of a hydrogen atom and lower alkyl radicals having 1 to 6 carbon atoms.

The aromatic polyamide can be prepared by any conventional condensation polymerization methods, for instance, a solution polymerization method or an interfacial polymerization method, applied to an aromatic dicarboxylic acid component and an aromatic diamine component. The cross-linking compound usable for the present invention can be selected from the compounds containing at least one unsaturated radical which is highly reactive radical to the aromatic polyamide and which is selected from the group consisting of those of formulae (III), (IV), (V) and (VI) defined hereinbefore.

The cross-linking compound containing the reactive radical of the formula (III) or (IV) may be selected from the class consisting of those of the formulae (VII) through (X):

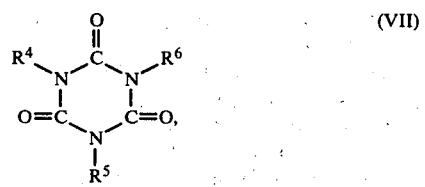

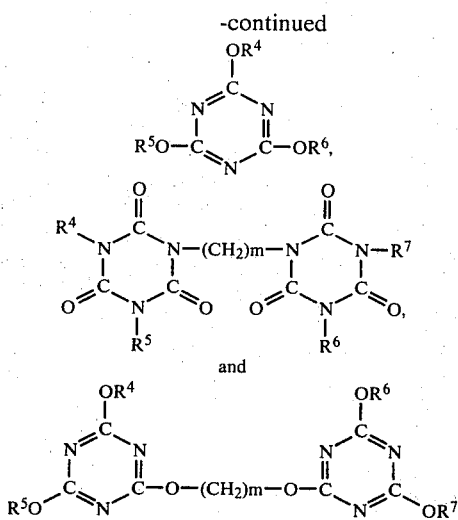

(VIII)

(IX)

and (X)

wherein at least any one member of $R^4$, $R^5$ and $R^6$ in the formulae (VII) and (VIII) and at least any one member of $R^4$, $R^5$, $R^6$ and $R^7$ in the formulae (IX) and (X), respectively represent, independently from each other, a member selected from the group consisting of the radicals of the formulae (III) and (IV), and the remaining members of $R^4$, $R^5$, $R^6$ and $R^7$ in the formulae (VII) through (X), respectively represent, independently from each other, a member selected from the group consisting of a hydrogen atom, alkyl radicals having 1 to 10 carbon atoms, hydroxyalkyl radicals having 1 to 10 carbon atoms, carboxyalkyl radicals in which the alkyl groups have 1 to 10 carbon atoms, and halogenated alkyl radicals having 1 to 10 carbon atoms, and m represents an integer of 1 or more.

The compound of the formulae (VII) through (X) may be selected from the class consisting of triallyl cyanurate, diallylmethyl cyanurate, polyethyleneallyl cyanurate, triallylisocyanurate, diallylmethyl isocyanurate, polyethyleneallyl isocyanurate, ethylene bis(diallyl cyanurate), tetramethylene bis(diallyl cyanurate), ethylene bis(diallyl isocyanurate), tetramethylene bis(diallyl isocyanurate), diallylhydroxyethyl isocyanurate, diallylhydroxyethyl isocyanurate, diallylcarboethoxy cyanurate, diallylcarboethoxy isocyanurate diallylchloroethyl cyanurate and diallylchloroethyl isocyanurate.

Also, the cross-linking compounds containing the reactive radicals of the formulae (III) and (IV) may involved dicarboxylic diallylesters, for example, diallyl malonate, diallyl succinate, diallyl glutarate, diallyl adipate and diallyl azelate, and allyl-substituted melamine compounds, for example, N,N-diallyl melamine, hexallyl hydroxymethyl melamine, hexallyl melamine and triallyl melamine.

The cross-linking compounds having the reactive radicals of the formulae (V) and (VI) may involve acrylic esters, for example, methyl acrylate, ethyl acrylate and butyl acrylate; methacrylic esters, for example, methyl methacrylate, ethyl methacrylate and 2-hydroxyethyl methacrylate; ethylene glycol and polyethylene glycol esters of acrylic and methacrylic acids, and; acrylic and methacrylic amides, for example, acrylamide and methacrylamide.

The cross-linking compound usable for the present invention may be selected from the compounds of the formulae (XI) and (XII) as defined hereinabove. This type of the cross-linking compound may involve cyanuric acid, isocyanuric acid, triethyl cyanuric acid, trietyl cyanuric acid, tris(hydroxyethyl) cyanuric acid, tris(hydroxyethyl) isocyanuric acid, tris(carboxyethyl) cyanuric acid, tris(carboxyethyl) isocyanuric acid, tris(chloroethyl) cyanuric acid and tris(carboxyethyl) isocyanuric acid.

The aromatic polyamide molecules in the film of the present invention are cross-linked with the cross-linking compound, preferably, in an amount of 10% or less, more preferably, from 1 to 5%, based on the weight of the aromatic polyamide. The formation of the cross-linkages can be effected by applying heat, ultraviolet rays or electron beam onto a precursory film comprising the aromatic polyamide and the cross-linking compound uniformly mixed with each other. In the aromatic polyamide film of the present invention, it should be noted that the formation of the cross-linkages causes the heat resistance and the dielectric breakdown strength of the resultant aromatic polyamide film to be remarkably enhanced without reduction of any mechanical properties thereof, for example, ultimate elongation at break.

It is generally known that when an aromatic polyamide article is exposed to an elevated temperature for a long period of time or treated with phosphoric acid or sulfuric acid aqueous solution at an elevated temperature, the polyamide molecules are cut and cross-linked with each other. However, it is also well known that the formation of the cross-linkages in the above-mentioned manner causes a significant deterioration in the mechanical properties of the resultant polyamide article. Therefore, the polyamide article is useless for practical use. When compared with the above-mentioned known method for producing the cross-linkages, it is surprisingly noted that the present invention enables the aromatic polyamide film to have excellent heat resistance and dielectric breakdown strength without reduction in the mechanical properties thereof, in spite of the formation of the cross-linkages.

For example, U.S. Pat. No. 3,287,324, of W. Sweeny et al, discloses that m-phenylene isophthalamide polymers are characterized by the existence of two linear forms, which are referred to as an "alpha" and a "beta" form. The α-form of m-phenylene isophthalamide polymers is soluble in polar solvents for example, N-methyl pyrrolidone, dimethyl acetamide and dimethyl formamide. The α-form of m-phenylene isophthalamide polymers may be converted by heat-treating it to the β-form thereof. The β-form of m-phenylene isophthalamide polymers is insoluble in the polar solvents mentioned above. However, it is, also, known that the m-phenylene isophthalamide polymers in the β-form are soluble in polar solvents containing a salt such as lithium chloride and calcium chloride. Futhermore, it is known that the m-phenylene isophthalamide polymers cross-linked by means of conventional heat-treatment at an elevated temperature or hot phosphoric acid treatment, are completely insoluble in concentrated sulfuric acid.

In the case of the m-phenylene isophthalamide film produced in accordance with the present invention, it is found that the treatment of the film with the concentrated sulfuric acid in which the conventional cross-linked m-phenylene isophthalamide polymer articles are completely insoluble results in only about 10 to 50% by weight of the film not being dissolved in the sulfuric acid. This phenomenon suggests that the cross-linkages in the film are weaker than those in the conventional cross-linked β-type m-phenylene isophthalamide polymer articles. However, when the same film as that mentioned above is treated with a polar solvent containing the salt, which solvent can completely dissolve the conventional cross-linked β-type m-phenylene isophthalamide polymer articles, it is found that about 90 to 100% by weight of the film is not dissolved in the salt-containing polar solvent. This phenomenon suggests that the m-phenylene isophthalamide polymer molecules in the film are more strongly cross-linked than those in the conventional polymer articles.

That is, the internal structure of the film suggested from the solubility of the film in the concentrated sulfuric acid is inconsistent with that suggested from the solubility of the film in the salt-containing polar solvent. This inconsistency suggests that the cross-linking mechanism in the aromatic polyamide film of the present invention is remarkably different from that in the conventional cross-linked aromatic polyamide articles.

The above-mentioned suggestion can be supported by the another phenomenon. Usually, the addition of an additive into an aromatic polyamide article results in reduction in the dielectric breakdown strength of the article. However, it is surprisingly noted that the addition of the cross-linking compound of the aromatic polyamide film in accordance with the present invention results in significant enhancement in the dielectric breakdown strength of the film.

In the process of the present invention, an aromatic polyamide and a cross-linking compound are mixed with a liquid, for example, a concentrated sulfuric acid or an organic liquid which is capable of dissolving the aromatic polyamide and the cross-linking compound, for example, dimethyl formamide, dimethyl acetamide, N-methyl-2-pyrrolidone and to provide a composition. If it is necessary, the composition may additionally contain at least one member selected from metal and ammonium halides, as a dissolving assistant, for example, calcium chloride, lithium chloride, magnesium chloride, lithium bromide, calcium bromide and ammonium bromide. The composition may be in the state of a solution or may be viscoelastic.

In the preparation of the composition, it is preferable that the amount of the mixture of the aromatic polyamide and the cross-linking compound be in a range of from 10 to 25% based on the weight of the composition. The cross-linking compound may be preliminarily mixed into the aromatic polyamide before the addition of the liquid. Otherwise a predetermined amount of the cross-linking compound may be mixed with a liquid and, then, a predetermined amount of the aromatic polyamide may be added to the cross-linking compound-liquid mixture.

The composition is shaped into a film by spreading the composition on a horizontal surface of a glass plate or a casting belt or by extruding the composition through a T-die. The film of the composition is converted into a precursory aromatic polyamide film, by removing the liquid from the composition in any conventional dry, wet or semi-dry manner.

If it is desired, the precursory aromatic polyamide film may be drawn in one or two directions at a draw ratio of 1.1 or more, preferably, 1.5 or more, by using any conventional drawing apparatuses, before the cross-linking operation. The drawing operation can be carried out either continuously or batch-wise. The drawing operation is effective for enhancing the heat resistance and the dielectric breakdown strength of the aromatic polyamide film.

The cross-linking operation for the precursory aromatic polyamide film is effected by applying heat, ultraviolet rays, electron beam or two or more thereof onto the precursory film. In the application of heat, the cross-linking operation is carried out preferably at a temperature of 250° C. or more, more preferably, 300° C. or more. In the application of ultraviolet rays, it is preferable to use an ultraviolet ray radiation source of at least 2 kw for 30 seconds or more. In the application of electron beam, it is preferable that the dose of the electron rays be at least 0.5 M rad.

The cross-linking operation may be carried out by a single application of each of heat, ultraviolet rays and electron beam or by an application of a combination of any two or all of heat, ultraviolet rays and electron beam. For example, heat is applied and, then, ultraviolet rays are applied onto the precursory film. In the application of heat alone, the precursory film may contain a radical reaction initiator. Also, in the application of ultraviolet rays alone, the precursory film may contain a sensitizer, for example, benzophenone. However, usually, the addition of the sensitizer is unnecessary, because the precursory aromatic polyamide film prepared in accordance with the process of the present invention is highly sensitive to the ultraviolet rays.

The aromatic polyamide film of the present invention is useful in various fields, for example, as a heat resistant insulating material, F.P.C. (Flexible Printed Circuit) substrate film and film for data processing business, due to its excellent heat resistance and electrical properties, for example, dielectric breakdown strength.

The following specific examples are presented for the purpose of clarifying the present invention. However, it should be understood that these are intended only to be examples of the present invention and are not intended to limit the present invention in any way.

Example 1 and Comparison Example 1

In Example 1, 20 parts by weight of a polymer, consisting of 97 molar % of m-phenylene isophthalamide repeating units and 3 molar % of terephthalic acid units, and having an inherent viscosity of 1.36, which has been determined in NMP N-methyl-2-pyrrolidone at a temperature of 30° C., at a concentration of the polymer of 0.5% by weight, 4 parts by weight of lithium chloride and 0.6 parts by weight of triallyl cyanurate were dissolved in 80 parts by weight of dimethyl acetamide. The solution was evenly spread on a horizontal surface of a glass plate by using a doctor knife. The film of the solution was dried at a temperature of 140° C. for 7 minutes, and the dried film was immersed in water at a room temperature and separated from the glass plate. The resultant precursory film was heated to a temperature of 80° C. over a night, while keeping the dimensions of the film the same as the original ones. The resultant film had a thickness of 30 microns. The film exhibited a tensile strength of 13.6 kg/mm$^2$, an ultimate elongation of 111%, an initial Young's modulus of 327 kg/mm$^2$ and a dielectric breakdown strength of 213 KV/mm.

In Comparison Example 1, procedures identical to those mentioned in Example 1 were carried out, except that no triallyl cyanuric acid was used. The resultant comparative film exhibited a tensile strength of 13.0 kg/mm$^2$, an ultimate elongation of 94%, an initial Young's modulus of 312 kg/mm$^2$ a dielectric breakdown strength of 146 KV/mm.

It is evident that the aromatic polyamide film of Example 1 exhibited a higher dielectric breakdown strength and heat resistance than those of Comparison Example 1.

EXAMPLE 2 AND COMPARISON EXAMPLE 2

In Example 2, the same aromatic polyamide film as that obtained in Example 1 was subjected to an application of ultraviolet rays by using an ultraviolet ray lamp of 2 KW, for 5 minutes, at a room temperature. The resultant film had a thickness of 34 microns and exhibited a tensile strength of 13.9 kg/mm$^2$, an ultimate elongation of 72% an initial Young's modulus of 311 kg/mm$^2$, a dielectric breakdown strength of 206 KV/mm and a thermal shrinkage of 2.3% at a temperature of 300° C.

In Comparison Example 2, the same aromatic polyamide film as that produced in Comparison Example 1 was exposed to ultraviolet rays in the same manner as that used in Example 2. The resultant comparative film exhibited a poor dielectric breakdown strength of 140 KV/mm and a large thermal shrinkage of 8.7% at 300° C.

It is clear that the aromatic polyamide film of Example 2 is superior, not only in the dielectric breakdown strength but, also, in the heat resistance, to that of Comparison Example 2.

EXAMPLE 3 AND COMPARISON EXAMPLE 3

In Example 3, the same procedures as those mentioned in Example 1 were carried out, except that the film of the solution on the glass plate was dried at a temperature of 150° C. for 7 minutes, the dried film was separated from the glass plate in water, the resultant transparent film was drawn in two directions each at a draw ratio of 2.5, in hot water, at a temperature of 95° C., and the drawn film was dried at a temperature of 80° C. while keeping the demensions of the film the same as the original ones. The dried precursory film had a thickness of 15 microns. The precursory film was exposed to ultraviolet rays in the same manner as that mentioned in Example 2, for 5 minutes. Thereafter, the film was heat-treated at a temperature of 350° C., for 5 minutes, while maintaining the initial size thereof.

The resultant film was subjected to tests for determining the tensile strength and dielectric breakdown strength thereof. The film was heated at a temperature of 250° C., for 98 hours, and thereafter, the tensile strength and the dielectric breakdown strength of the heated film was measured. Separately, the tensile strength of the film at a temperature of 200° C. was tested. The results of the above-mentioned measurements are shown in Table 1.

In Comparison Example 3, the same procedures as those mentioned in Example 3 were carried out, except that no triallyl cyanuric acid was used. The results are shown in Table 1.

TABLE 1

| | Tensile strength (kg/mm$^2$) | | | | | Dielectric breakdown strength (KV/mm) | |
|---|---|---|---|---|---|---|---|
| Example | Original | At 200° C. | Ratio of strength at 200° C. to original strength (%) | After heating at 250° C. for 98 hrs. | Ratio of strength after heating to original strength (%) | Original | After heating at 250° C. for 98 hrs. |
| Example 3 | 17.3 | 12.1 | 69.9 | 16.8 | 97 | 285 | 287 |
| Comparison Example 3 | 16.7 | 9.2 | 55.0 | 13.1 | 78 | 207 | 206 |

Table 1 shows that the film of Example 3 is superior not only in the dielectric breakdown strength but, also, in the heat resistance to the film of Comparison Example 3.

EXAMPLES 4 and 5

In each of Examples 4 and 5, the same procedures as those mentioned in Example 3 were carried out, except that the triallyl cyanurate was used in an amount as indicated in Table 2, based on the weight of the polyamide. The results are shown in Table 2.

TABLE 2

| | Amount of triallyl cyanurate (%) | Dielectric breakdown strength (KV/mm) | Tensile strength (kg/mm$^2$) | | Ratio of strength after heating to original strength (%) |
|---|---|---|---|---|---|
| Example | | | Original | After heating at 250° C. for 98 hrs. | |
| Example 4 | 1 | 256 | 16.3 | 14.7 | 90 |
| Example 5 | 5 | 287 | 15.3 | 14.6 | 95 |

Table 2 illustrates the fact that the films of Examples 4 and 5 exhibit an excellent heat resistance and dielectric breakdown strength, respectively.

EXAMPLES 6 THROUGH 13 AND COMPARISON EXAMPLES 4 AND 5

In each of the Examples 6 through 13, the same procedures as those mentioned in Example 3 were carried out, except that a cross-linking compound as indicated in Table 3 was used and the drawing operation was carried out at a draw ratio indicated in Table 3. The resultant film had a thickness indicated in Table 3. The dielectric breakdown strength of the resultant film is also shown in Table 3.

In Comparison Example 4, the same procedures as those mentioned in Example 3 were carried out, except that the triallyl cyanurate was replaced with benzophenone and the thickness of the film was 17 microns.

In Comparison Example 5, the same procedures as those mentioned in Example 3 were carried out, except that no triallyl cyanuric acid was used and the resultant film was 18 microns thick.

TABLE 3

| Example No. | Cross-linking Compound | Draw ratio | Thickness of film ($\mu$) | Dielectric breakdown strength (KV/mm) |
|---|---|---|---|---|
| 6 | triallyl cyanurate | 2 × 2 | 17 | 293 |
| 7 | triallyl cyanurate | 1.5 × 1.5 | 18 | 288 |
| 8 | triallyl isocyanurate | 2 × 2 | 17 | 267 |
| 9 | Cyanuric acid | 2 × 2 | 18 | 249 |
| 10 | Isocyanuric acid | 2 × 2 | 18 | 256 |
| 11 | Tris (2-hydroxyethyl) cyanuric acid | 2 × 2 | 16 | 272 |
| 12 | Tris (2-carboxyethyl) cyanuric acid | 2 × 2 | 17 | 269 |
| 13 | Diallyl cyanuric acid | 2 × 2 | 18 | 245 |
| Comparison Example 4 | Benzophenone | 2 × 2 | 17 | 207 |
| Example 5 | none | 2 × 2 | 18 | 216 |

Table 3 illustrates that the films of Examples 6 through 13 are superior in dielectric breakdown strength to that of Comparison Examples 4 and 5.

EXAMPLE 14 AND COMPARISON EXAMPLE 6

In Example 14, the same procedures as those mentioned in Example 3 were carried out, except that the solution contained 0.1 part by weight of dimethoxyphenyl acetophenone as a sensitizer, the solution film was dried at a temperature of 150° C. for 8 minutes, the draw ratio was 2.0 in each direction and the resultant film was 17 microns thick. The properties of the film are shown in Table 4.

In Comparison Example 6, the same procedures as those mentioned in Example 14 were carried out, except that no cross-linking compound was used. The properties of the comparative film are shown in Table 4.

TABLE 4

| Example | Tensile strength (kg/mm²) | | | | | Dielectric breakdown strength KV/mm | Thermal Shrinkage (%) | |
|---|---|---|---|---|---|---|---|---|
| | Original | After heating at 250° C. for 98 hrs. | Ratio of strength after heating to original strength (%) | At 200° C. | Ratio of strength at 200° C. to original strength (%) | | 280° C. | 300° C. |
| Example 14 | 16.2 | 15.3 | 94 | 11.7 | 71.8 | 307 | 0.7 | 0.9 |
| Comparison Example 6 | 16.7 | 13.1 | 78 | 9.2 | 55.0 | 207 | 3.0 | 7.7 |

EXAMPLES 15 AND COMPARISON EXAMPLE 7

In Example 15, procedures identical to those described in Example 3 were carried out, except that the triallyl cyanurate was replaced with ethylene bis(diallyl cyanurate), the film of the solution was dried at a temperature of 140° C. for 7 minutes, the dried film was drawn in two directions each at a draw ratio of 1.8 and the drawn film was 25 microns thick.

In Comparison Example 7, the same procedures as those described in Example 15 were carried out, except that no ethylene bis(diallyl cyanurate) was used.

The dielectric breakdown strengths and thermal shrinkages at temperatures of 260° C. and 300° C., of the films of Example 15 and Comparison Example 7 are shown in Table 5.

TABLE 5

| Property | | Example 15 | Comparison Example 7 |
|---|---|---|---|
| Dielectric breakdown strength (KV/mm) | | 280 | 203 |
| Thermal Shrinkage (%) | 260° C. | 0.3 | 3.0 |
| | 300° C. | 0.7 | 7.7 |

When treated with a 96% concentrated sulfuric acid, at a temperature of 25° C., for 20 hours, it was observed that 10% by weight of the film of Example 15 was not dissolved in the sulfuric acid. However, the film of Comparison Example 7 was completely dissolved. Also, when treated with dimethyl acetamide solvent containing 6% by weight of lithium chloride, at a temperature of 85° C., for 3 hours, it was found that 96% by weight of the film of Example 15 was not dissolved in the solvent. However, the film of Comparison Example 7 was completely dissolved in the solvent.

Furthermore, the mechanical properties of the films of Example 15 and Comparison Example 7 at a room temperature, and temperatures of 150° C. and 200° C., were measured. The results are shown in Table 6.

TABLE 6

| Temperature | Property | Example 15 | Comparison Example 7 |
|---|---|---|---|
| Room temperature | Tensile strength (kg/mm²) | 17.6 | 17.5 |
| | Ultimate elongation (%) | 75 | 76 |
| | Initial Young's Modulus (kg/mm²) | 380 | 302 |
| 150° C. | Tensile strength (kg/mm²) | 13.5 | 9.3 |
| | Ultimate elongation (%) | 80 | 85 |
| | Initial Young's Modulus (kg/mm²) | 320 | 240 |
| 200° C. | Tensile strength (kg/mm²) | 10.9 | 8.7 |
| | Ultimate elongation (%) | 90 | 96 |
| | Initial Young's Modulus (kg/mm²) | 295 | 210 |

Table 6 clearly shows that the film of Example 15 is superior in the heat resistance to that of Comparison Example 7.

Moreover, in order to test the thermal deterioration property, the films of Example 15 and Comparison Example 7 were placed in a hot air type gear aging tester at a testing temperature of 250° C. The results of the aging test are shown in Table 7.

TABLE 7

| Aging time (hr.) at 250° C. | | Example 15 | Comparison Example 7 |
|---|---|---|---|
| 300 | Tensile strength (kg/mm$^2$) | 17.2 | 15.8 |
| | Ratio (1) (%) | 98 | 90 |
| 500 | Tensile strength (kg/mm$^2$) | 16.3 | 14.0 |
| | Ratio (2) (%) | 93 | 80 |
| 1,000 | Tensile strength (kg/mm$^2$) | 15.8 | 13.1 |
| | Ratio (3) (%) | 90 | 75 |
| 1,500 | Tensile strength (kg/mm$^2$) | 15.5 | 12.3 |
| | Ratio (4) (%) | 89 | 70 |

Note:

Ratio (1) = $\frac{\text{Strength after 300 hour aging}}{\text{Initial strength}} \times 100(\%)$ Ratio (2) = $\frac{\text{Strength after 500 hour aging}}{\text{Initial strength}} \times 100(\%)$ Ratio (3) = $\frac{\text{Strength after 1,000 hour aging}}{\text{Initial strength}} \times 100(\%)$ Ratio (4) = $\frac{\text{Strength after 1,500 hour aging}}{\text{Initial strength}} \times 100(\%)$ Table 7 clearly shows that the resistance of the film of Example 15 to the thermal deterioration is remarkably superior to that of Comparison Example 7.

EXAMPLE 16 AND COMPARISON EXAMPLE 8

The same procedures as those mentioned in Example 15 were carried out in Example 16, except that N,N-diallyl melamine was used in place of the ethylene bis(-diallyl cyanurate), the drawing operations in two directions were carried out each at a draw ratio of 1.9 and the drawn film was 30 microns thick. The resultant film exhibited a dielectric breakdown strength of 240 KV/mm.

In Comparison Example 8, the same procedures as those described in Example 16 were carried out, except that no N,N-diallyl melamine was used. The resultant comparative film having a thickness of 30 microns, exhibited a dielectric breakdown strength of 196 KV/mm, which was remarkably inferior to that of Example 16.

EXAMPLE 17

The same procedures as those described in Example 15 were carried out, except that the ethylene bis(diallyl cyanulate was replaced by triallyl cyanurate, the solution contained as a sensitizer, 0.1 part by weight of Perhexa 2.5B (which is a trademark of peroxide, made by Nippon Oil and Fat Company, Japan), the draw ratio was 2.0, and the drawn film was 20 microns thick. The resultant film exhibited a dielectric breakdown strength of 264 KV/mm and a ratio of 86% of the strength of the film after 500 hours of aging, at a temperature of 250° C., to the initial strength of the film.

EXAMPLE 18

Procedures identical to those of Example 15 were carried out, except that triallyl isocyanurate was used in place of the ethylene bis(diallyl cyanurate), and the drawn transparent film had a thickness of 18 microns. The drawn film was exposed to electron beam at a dose of 10 Mrad by using a Hypertoron 30 EBCA-300A type electron radiation apparatus.

The resultant film exhibited a dielectric breakdown strength of 90 KV/mm and a ratio of 91% of the strength of the film after an aging test at a temperature of 250° C., for 500 hours, to the initial strength of the film.

EXAMPLES 19 THROUGH 24 AND COMPARISON EXAMPLE 9

In each of Examples 19 through 24, the same operations as those described in Example 15 were carried out, except that the aromatic polyamide having an inherent viscosity of 1.30 was used, the ethylene bis(diallyl cyanurate) was replaced with a cross-linking compound indicated in Table 8, the draw ratio in each direction was 2.0 and the drawn film had a thickness as indicated in Table 8.

The resultant film was subjected to an aging test at a temperature of 250° C. for 700 hours. A ratio in % of the tensile strength of the film after the aging test to the initial tensile strength of the film was calculated. Also, the film was treated in a dimethyl acetamide solvent containing 6% by weight of lithium chloride, at a temperature of 85° C., for 3 hours. The amount of a portion of the film not dissolved in the solvent was measured.

In comparison Example 9, the same procedures as those described in Example 19 were carried out, except that no cross-linking agent was used.

The results of the examples and the comparative example are shown in Table 8.

TABLE 8

| Example No. | Cross-linking compound | Thickness of drawn film (micron) | Ratio of strength after aging test to initial strength of film (%) | Amount (% by weight) of non-dissolved portion of film in testing solvent |
|---|---|---|---|---|
| 19 | Diallyl malonate | 15 | 85 | 93 |
| 20 | Diallyl adipate | 14 | 91 | 89 |
| 21 | 2-Hydroxyethyl methacrylate | 20 | 87 | 90 |
| 22 | Methacrylamide | 18 | 85 | 91 |
| 23 | NK-2G | 20 | 92 | 94 |
| 24 | Diallyl maleate | 25 | 82 | 93 |
| Comparison Example 9 | none | 25 | 78 | 0 |

Note: NK-2G is a trademark of a compound of the formula, CH$_2$=C(CH$_3$)COO-(-CH$_2$CH(CH$_3$)O-)$_2$OCC(CH$_3$)=CH$_2$, made by Shin-Nakamura Chemical Co., Ltd.

Example 25 and Comparison Example 10

In Example 25, a casting solution was prepared by dissolving 10 parts of a polyamide which comprised 95 molar% of m-phenylene terephthalamide repeating units and 5 molar% of p-phenylene terephthalamide units, and which had an inherent viscosity of 2.1 determined in the same manner as that mentioned in Example 1, 4.9 parts by weight of calcium chloride, 1.5 parts by weight of water and 0.3 parts by weight of triallyl cyanurate in a solvent mixture of 29.4 parts by weight of dimethyl acetamide with 53.8 parts by weight of N-methyl-2-pyrrolidone. The solution was cast by spreading the solution on a horizontal glass plate and the cast solution was dried at a temperature of 160° C. for 8 minutes. The dried film was immersed in water and separated from the glass plate in water. The film was drawn in a hot water, at a temperature of 95° C., in two directions each at a draw ratio of 1.7. The drawn film was dried at a temperature of 80° C., while maintaining the original dimensions of the film. The dried film was exposed to ultraviolet rays by using a 2 KW ultraviolet ray lamp for 5 minutes. Thereafter, the film was heat treated at a temperature of 350° C., for 5 minutes, while keeping the size of the film constant. The resultant film had a thickness of 26 microns and exhibited a dielectric breakdown strength of 247 KV/mm and thermal shrinkages of 0.5% at 260° C. and of 1.2% at 300° C.

In Comparison Example 10, the same procedures as those described in Example 25 were carried out, except that no triallyl cyanurate was used. The resultant comparative film exhibited a dielectric breakdown strength of 203 KV/mm and thermal shrinkages of 3.2% at 260° C. and 5.6% at 300° C.

It is evident that the film of Example 25 is superior in the dielectric breakdown strength and the heat resistance to the comparative film of Comparison Example 10.

Example 26 and Comparison Example 11

In Example 26, a casting solution was prepared by dissolving 6 parts by weight of an aromatic polyamide which had an amine moiety consisting of 50 molar % of 3,4'-diaminodiphenylether and 50 molar % of p-phenylene diamine and an acid moiety consisting of terephthalic acid and which had an inherent viscosity of 2.89 determined in the same manner as that described in Example 1, 2.3 parts by weight of calcium chloride and 0.18 parts by weight of triallyl isocyanurate, in 94 parts by weight of N-methyl-2-pyrrolidone solvent. The solution was spread on a horizontal glass plate to cast it into a film. The film of the solution was dried at a temperature of 150° C. for 7 minutes and the dried film was separated from the glass plate in water. The film was drawn in two directions each at a draw ratio of 1.5. The drawn film was subjected to the same ultraviolet ray radiation and heat treatment as those mentioned in Example 25. The resultant film exhibited a tensile strength of 35 kg/mm$^2$, an ultimate elongation of 32%, a Young's modulus of 820 kg/mm$^2$ and a ratio of the tensile strength of the film after an aging test, at a temperature of 250° C., for 300 hours, to the initial tensile strength of the film, of 85%.

In Comparison Example 11, the same operations as those described in Example 26 were carried out, except that no triallyl isocyanurate was used. The resultant comparative film exhibited a ratio of 70% of the tensile strength after the aging test at 250° C., for 300 hours, to the initial strength of the film. That is, it is evident that the resistance to thermal deterioration of the film of the present invention is superior to that of Comparison Example 11.

Examples 27 through 29 and Comparison Examples 12 through 14

In each of Examples 27, 28 and 29, the same operations as those described in Example 26 were carried out, except that the aromatic polyamide contained the aromatic groups $Ar_1$ and $Ar_2$ in the formula (I), indicated in Table 9, and had an inherent viscosity indicated in Table 9, the triallyl cyanurate in an amount indicated in Table 9 was used in place of triallyl isocyanurate, and no drawing operation was applied to the dried film.

In each of Comparison Examples 12, 13 and 14 which respectively corresponded to Examples 27, 28 and 29, the same procedures as those mentioned in the corresponding example were carried out, except that no triallyl cyanurate was used.

The results of Example 27 through 29 and Comparison Examples 12 through 14 are shown in Table 9.

TABLE 9

| | Aromatic polyamide | | | Amount of triallyl cyanurate (wt %) | Film Tensile strength at room temperature (kg/mm$^2$) | Ratio of tensile strength after aging test to initial strength (%) |
|---|---|---|---|---|---|---|
| Example | $Ar_1$ | $Ar_2$ | Inherent viscosity | | | |
| Example 27 | (phenyl with Cl) | (phenyl) | | 3 | 30 | 87 |
| Comparison Example 12 | | | 3.1 | 0 | 30 | 71 |
| Example 28 | (phenyl) | (phenyl) | | 3 | 37 | 84 |
| Comparison Example 13 | | | 3.2 | 0 | 37 | 69 |
| Example 29 | (phenyl) | (phenyl) | | 3 | 25 | 89 |
| Comparison Example 14 | | | 2.2 | 0 | 25 | 76 |

Table 9 shows that the films of Example 27, 28 and 29 are respectively superior in resistance to thermal deterioration to that of Comparison Examples 12, 13 and 14.

What we claim is:

1. An aromatic polyamide film comprising at least one aromatic polyamide containing repeating units of the formula selected from the group consisting of

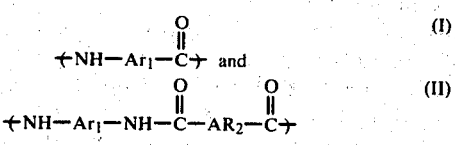

wherein $Ar_1$ and $Ar_2$ respectively represent, independently from each other, a member of the group consisting of unsubstituted and substituted divalent aromatic radicals which comprise a single aromatic ring, two or more aromatic rings that are condensed together, two or more aromatic rings that are linked together by a single bond, or two more aromatic rings that are linked together by a bridging atom or radical, which is oriented either meta or para, said aromatic polyamide molecules being cross-linked with at least one cross-linking compound selected from the group consisting of compounds which have at least one radical selected from the group consisting of radicals of the formulae (III), (IV), (V) and (VI):

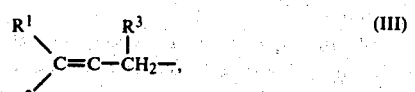

and wherein $R^1$, $R^2$, and $R^3$ respectively represent, independently from each other, a member selected from the group consisting of hydrogen and alkyl radicals having 1 to 6 carbon atoms, and compounds of the formulae (XI) and (XII):

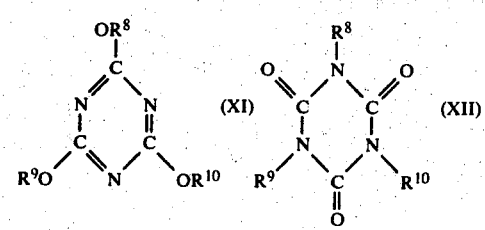

wherein $R^8$, $R^9$ and $R^{10}$ respectively represent, independently from each other, a member selected from the group consisting of hydrogen, alkyl radicals having 1 to 10 carbon atoms, hydroxyalkyl radicals having 1 to 10 carbon atoms, carboxyalkyl radicals having 1 to 10 carbon atoms and halogenated alkyl radicals having 1 to 10 carbon atoms.

2. An aromatic polyamide film as claimed in claim 1 wherein cross-linkages are formed by applying ultraviolet rays onto said aromatic film containing said cross-linking compound.

3. An aromatic polyamide film as claimed in claim 1 wherein cross-linkages are formed by applying an electron beam onto said aromatic polyamide film containing said cross-linking compound.

4. An aromatic polyamide film as claimed in claim 1, wherein said aromatic polyamide comprises at least 75 mole % of said at least one aromatic polyamide containing repeating units of the formula selected from the group consisting of formulae (I) and (II).

5. An aromatic polyamide film as claimed in claim 1, wherein said $Ar_1$ and $Ar_2$ in said formulae (I) and (II) are respectively selected, independently from each other, from the group consisting of the radicals of the formulae:

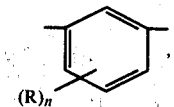

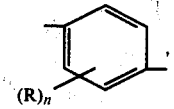

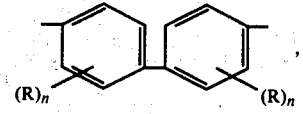

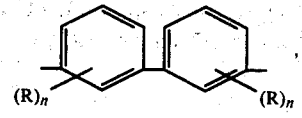

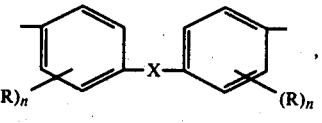

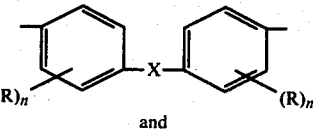

and

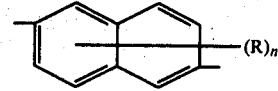

wherein R represents a member selected from the group consisting of lower alkyl radicals having 1 to 6 carbon atoms, lower alkoxy radicals having 1 to 6 carbon atoms, halogen atoms and a nitro radical, n represents zero or an integer of from 1 to 4 and X represents a member selected from the group consisting of

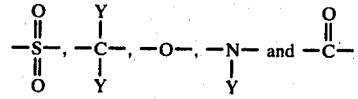

wherein Y represents a member independently selected from the group consisting of hydrogen atom and lower alkyl radicals having 1 to 6 carbon atoms.

6. An aromatic polyamide film as claimed in claim 1, wherein said cross-linking compounds having at least one radical selected from the group consisting of radicals of the formulae (III) and (IV) are selected from the group consisting of compounds of the formulae (VII) through (X):

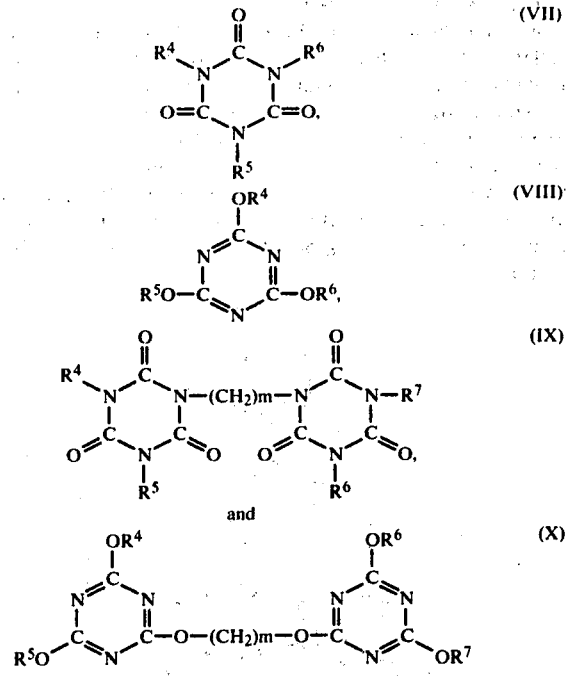

wherein at least any one member of $R^4$, $R^5$ and $R^6$ in the formulae (VII) and (VIII) and at least any one member of $R^4$, $R^5$, $R^6$ and $R^7$ in the formulae (IX) and (X) respectively represent, independently from each other, a member selected from the group consisting of the radicals of the formulae (III) and (IV), and the remaining members of $R^4$, $R^5$, $R^6$ and $R^7$ in the formulae (VII) through (X) respectively represent, independently from each other, a member selected from the group consisting of hydrogen alkyl radicals having 1 to 10 carbon atoms, hydroxyalkyl radicals having 1 to 10 carbon atoms, carboxyalkyl radicals in which the alkyl groups have 1 to 10 carbon atoms and halogenated alkyl radicals having 1 to 10 carbon atoms, and m represents an integer of 1 or more.

7. An aromatic polyamide film as claimed in claim 1, wherein said aromatic polyamide molecules are cross-linked with said cross-linking compound in an amount of 10% or less based on the weight of said aromatic polyamide.

8. An aromatic polyamide film as claimed in claim 1, wherein cross-linkages are formed by applying heat onto said aromatic polyamide film containing said cross-linking compound.

9. The film of claim 5 wherein the aromatic polyamide film comprises m-phenylene isophthalamide repeating units.

10. The film of claim 1 wherein the cross-linking compound contains at least one radical of the formula
$CH_2=CH_2CH_2-$.

11. The film of claim 10 wherein the cross-linking compound is triallyl cyanurate.

* * * * *